Jan. 28, 1969 G. H. MOREY 3,424,362
APPARATUS FOR MAKING HEATING ELEMENT
Original Filed Dec. 18, 1964 Sheet 1 of 3

INVENTOR.
GLEN H. MOREY
BY
Melvin A. Crosby

Jan. 28, 1969  G. H. MOREY  3,424,362
APPARATUS FOR MAKING HEATING ELEMENT
Original Filed Dec. 18, 1964  Sheet 2 of 3

INVENTOR.
GLEN H. MOREY
BY
Melvin A. Crosley

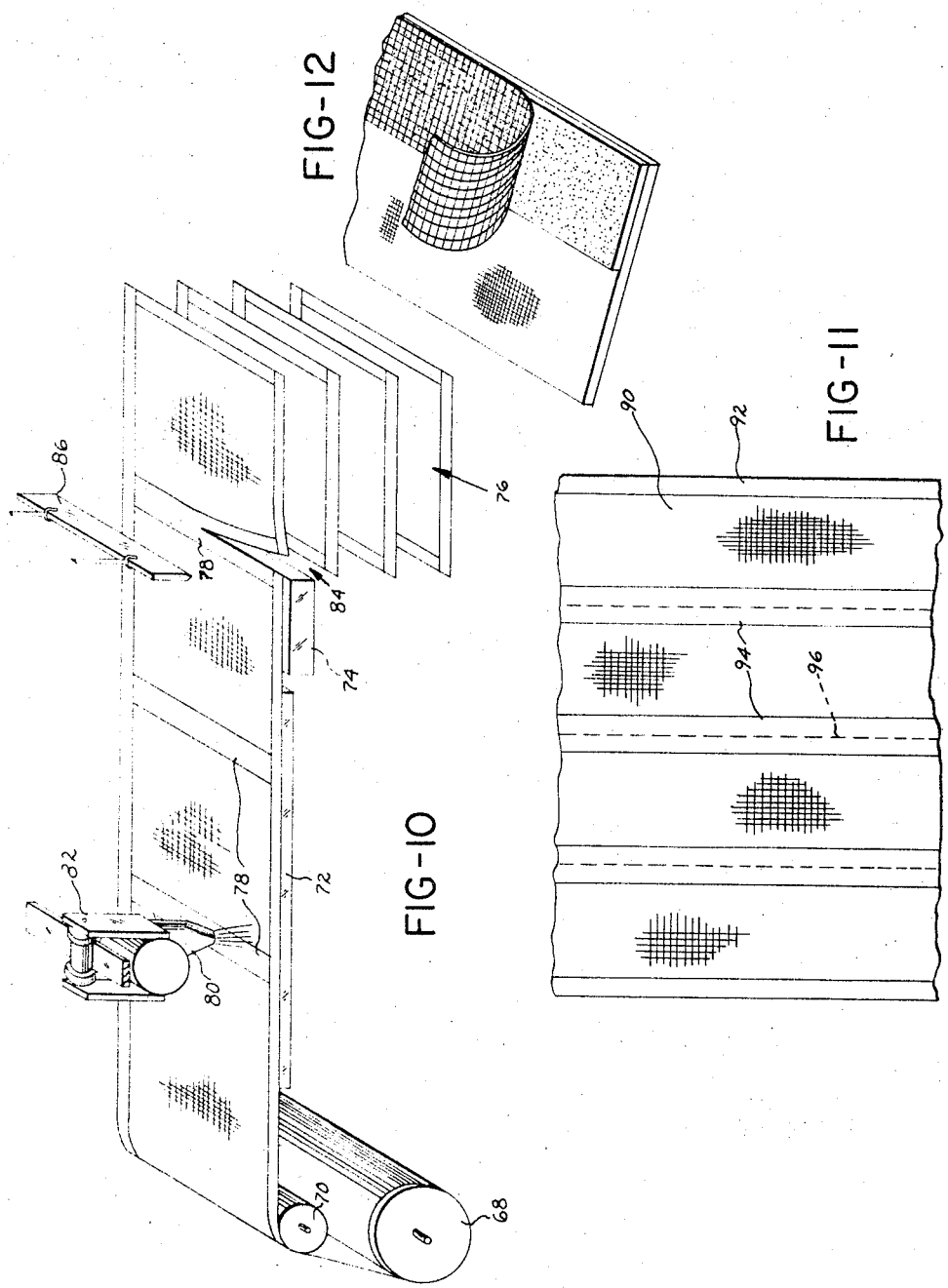

United States Patent Office

3,424,362
Patented Jan. 28, 1969

3,424,362
APPARATUS FOR MAKING HEATING ELEMENT
Glen H. Morey, Terre Haute, Ind., assignor to Templeton Coal Company, Terre Haute, Ind., a corporation of Indiana
Original application Dec. 18, 1964, Ser. No. 419,443, now Patent No. 3,349,359, dated Oct. 24, 1967. Divided and this application Feb. 20, 1967, Ser. No. 617,233
U.S. Cl. 228—5                                          10 Claims
Int. Cl. B23k *1/20;* H05k *3/34*

ABSTRACT OF THE DISCLOSURE

Apparatus for making electric resistance heaters from a fabric with conductive fibers therein having means to apply conductive coating to the fabric, and means to apply conductive strips to the coating to form terminals for the heater. Apparatus also includes means to cut fabric into lengths and means to coat the cut edges to prevent fraying.

*Cross-reference to a related application*

This invention relates to heating elements and represents, in part, improvements on the invention disclosed in my issued Patent No. 2,985,860, and in a division of my copending application Ser. No. 419,443, filed Dec. 18, 1964 and now Patent No. 3,349,359.

*Background of the invention*

In the patent referred to above, there is shown a heating element characterized in that the heating element proper consists of a fabric that is made up, at least partially, of electrically conductive fibers in the form of graphite. Fibers of this nature can be arrived at, for example, by baking synthetic fibers, such as rayon fibers, at a predetermined temperature for a predetermined length of time in a controlled atmosphere. The particular conditions under which the fibers are baked determines the character of the graphite into which the fibers are converted, and this, in turn, determines the resistance of the fibers. In general, the resistance of the fibers decreases to a predetermined substantially constant value over a predetermined baking period and by stopping the baking period at a selected time, the character of the graphite to which the fibers are converted can be controlled to a certain degree.

A characteristic of the graphitized or carbonized fibers of this nature is that they are extremely fragile and thus can be used to form fabrics completely of the graphitized fibers only with great difficulty. Completely graphitic fabrics are thus generally made by weaving the fabric and then baking the fabric as a unit.

I have found, however, that graphitized fibers can be handled when combined with other fibers and woven into a fabric that possesses considerable strength while retaining full flexibility, and at the same time be characterized in being electrically conductive in at least one direction, namely, the direction in the fabric in which the graphitized fibers run.

When graphitized fibers are woven together with glass fibers or other electrically non-conductive fibers of a desired mechanical strength, the said other fibers appear to support and hold the graphitized fibers and to remove mechanical loads therefrom so that the graphitized fibers will retain their essential identity even under substantial physical abuse.

A woven fabric of this nature is capable, furthermore, of being sealed and mechanically supported and reinforced by coatings, for example, of silicone rubber or other plastic materials of that nature having the characteristics of resistance to deterioration under somewhat elevated temperatures together with flexibility and electrical non-conductivity.

Heating elements of the nature disclosed in this application, and in the patent referred to above, have the advantage of being extremely inexpensive, having long life, and developing heat over substantially the complete area of the heating element whereby a substantial caloric output of the heating element can be maintained with relatively low temperatures being developed in the individual graphitized fibers. This feature will be evident from a comparison of a heating element according to the present invention and a heating element of a more conventional type in which resistance wires are employed. Resistance wires have a relatively small area, and thus must be operated at relatively high temperatures to give a certain yield of heat; and as opposed to this, a heating element according to this invention has a multiplicity of graphitized fibers in the form of threads or yarns or rovings each of which has a substantial area, and each of which conducts electric current, so that at a relatively low temperature for the individual fibers, a large amount of heat is produced over a given area.

The combination of graphitized fibers and non-conductive fibers lends itself readily to the formation of heating elements having any desired voltage and wattage characteristics within ranges where the temperature limitations might be on the order of about 400 to 500° F. Thus, by weaving more graphite fibers in a certain cloth area, the resistance of the cloth is decreased and it can be made to operate at less voltage than a corresponding fabric with fewer graphite fibers.

A particular feature of a heating element according to the present invention is that it can be made of any size and the resistance can readily be calculated by varying the concentration of the graphite fibers therein. Thus, the resistance of the heating element is given as ohms per square, which is to say that any square of the heating element regardless of its dimensions have the same resistance This particular feature permits the heating element to be made to any dimensions and the performance thereof can be accurately predicted.

Other conductive fibers for use in the fabric are also contemplated, for example, glass fibers coated with a conductive material such as metal, or a metal oxide, or graphite in some form. Fibers of this nature can be woven into the fabric in the same manner as the graphite fibers and will impart conductivity to the fabric and will be protected by the surrounding fibers of the fabric.

The particular problem dealt with by the present invention is that of providing terminal strips on the heating element for conducting electrical current thereto, and to a method and apparatus for applying such terminal strips.

*Summary of the invention*

With the foregoing in mind, a particular object of the present invention is the provision of a novel apparatus for making a fabric heating element containing conductive fibers and having electrically conductive terminal strips attached thereto.

Still another object of the present invention is the provision of a novel apparatus for applying terminal strips to a fabric heating element containing conductive fibers.

Still another object of this invention is the provision of an apparatus operative for continuously applying a terminal strip to fabric-like heating elements containing conductive fibers.

A still further object of this invention is the provision of an apparatus for forming heating elements made of fabric containing conductive fibers together with terminal strips on two opposed edges, and with the other two opposed edges of the fabric being sealed against fraying.

Brief description of the drawings

These and other objects and advantages of this invention will become more apparent upon reference to the following specification taken in connection with the accompanying drawings, in which:

FIGURE 10 is a schematic view showing an arrangement for cutting the fabric into short lengths;

FIGURE 11 shows a modification; and

FIGURE 12 is a perspective view showing the use of a strip of screen as a conductive member on the heater.

Description of the operation of the preferred embodiments

Figure 1:
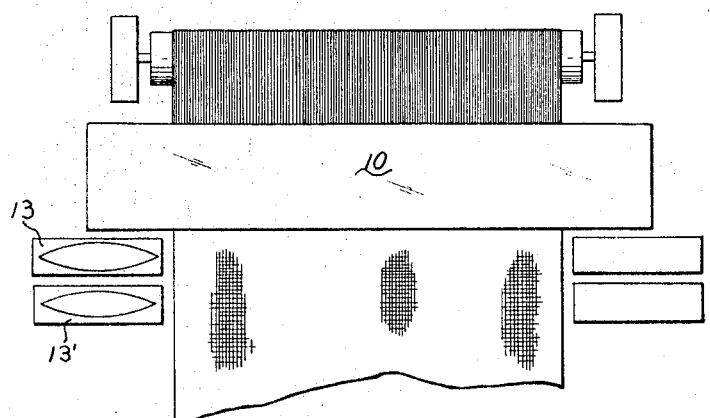
FIGURE 1 is a schematic view of a loom which may be substantially conventional and on which is woven a fabric according to the present invention.

Referring to the drawings somewhat more in detail, in FIGURE 1, 10 indicates a loom which may be of a conventional type and which may be a conventional loom, but which advantageously can be a ribbon loom. It is proposed to weave fabric according to the present invention from widths which are relatively narrow, say, as narrow as a half inch up to widths as wide as can be made in a loom and which fabrics might take on the proportions of theater curtains or drops.

In making the fabric, at least part of the fibers runnings in both directions are conductive, and which fibers may be produced by baking fibers, threads, yarns or rovings of synthetic material such as rayon, at a controlled temperature in a controlled atmosphere for a controlled length of time, or by coating non-conductive fibers, such as glass, with a conductive coating of metal or a metal oxide or graphite.

These fibers, the term "fibers" intending to include all elongated forms of the conductive material, including monofilaments, threads, yarns and rovings, both twisted and untwisted, may be wound on the warp beam 11 of the loom, together with other fibers of a non-conductive nature, and which fibers may consist of cotton, wool, synthetic materials, glass, asbestos, quartz or other filamentary materials characterized in a fair amount of mechanical strength, flexibility and substantial electrical non-conductivity.

The fill or weft threads, woven into the fabric in the loom, as by shuttle means 13 and 13', consist in part of electrically non-conductive fibers or filamentary material of the nature referred to above, and, in part, of electrically conductive fibers. Such conductive fill threads can be put in the fabric by a shuttle changing loom of conventional nature.

In FIGURE 1 there is diagrammatically illustrated a shuttle changing loom having shuttle 13 for non-conductive fibers and shuttle 13' for conductive fibers, and shuttle boxes to receive the respective shuttles.

In substantially every loom, and particularly in a ribbon loom, the side edges of the fabric will consist of loops where the fill thread turns and passes back through the shed, and for this reason, the side edges of the fabric are substantially free of any tendency to ravel or fray. These side regions thus form ideal places for the electrically conductive strips to be secured to the fabric and also permit the electrically conductive strips to be applied to the fabric in continuous lengths.

According to the present invention, in order to enhance the intimacy of the electrical connection of the conductive stripes to the fabric, the warp threads at the side edges of the fabric have a concentration of conductive fibers therein, and may even include a plurality of conductive fibers in adjacent relation extending over the same lateral range of the fabric as the conductive strips to be applied thereto. These fibers run at right angles to the conductive fibers put in the fabric by the shuttle means that contain the conductive fibers and, since the conductive warp and fill fibers are interwoven at the side edges of the fabric, they are in electrical contact with each other.

Figure 2:
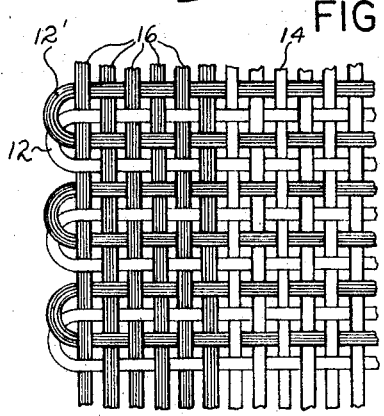
FIGURE 2 is a fragmentary view showing the fabric issuing from the loom at one side edge and drawn at considerably larger scale to show the conductive and non-conductive fibers in the fabric.
Figure 3:
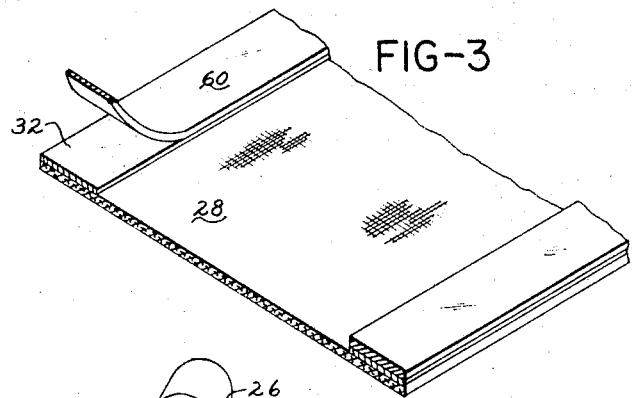
FIGURE 3 is a perspective somewhat schematic view showing a heating element according to the present invention with terminal strips attached to the side edges thereof for being connected to a voltage source for developing heat in the heating element.

FIGURE 2, which is a fragmentary view of one edge of the fabric drawn at enlarged scale, thus shows weft or fill threads 12, some of which are electrically non-conductive, and others, at 13', which are conductive in uniformly distributed relation, while the warp threads, consisting of both non-conductive fibers 14 and conductive fibers 16 are arranged with the conductive fibers concentrated along the side edge of the fabric. As shown, the conductive weft fibers 12 alternate with the non-conductive weft fibers 12', but they could bear any relationship to each other as long as sufficient non-conductive fibers were retained to give the fabric strength and stability, while sufficient conductive fibers are uniformly distributed in the fabric body to impart to it the desired electrical qualities.

As mentioned, at each side edge of the fabric there is a plurality of conductive fibers 16 in side-by-side relation, and these are provided for the purpose referred to above, namely, to enhance the electrical connection of the conductive strips to the conductive fibers of the fabric.

Figure 4:
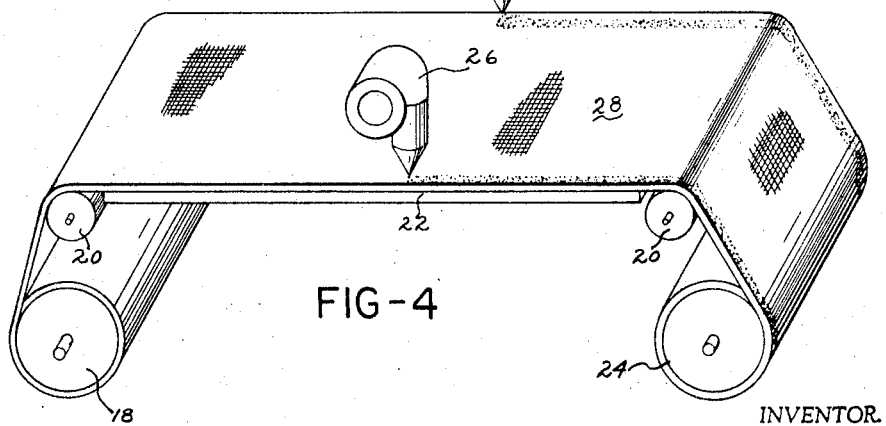
FIGURE 4 is a somewhat diagrammatic perspective view showing the metallizing of the side edges of the fabric that comes from the loom preparatory to attaching the terminal strips thereto.

FIGURE 4 shows a treatment of the fabric after it has left the loom. In FIGURE 4 a supply of the fabric is shown at 18 as it is taken from the loom. This fabric passes over spaced supporting rollers 20, and a supporting table 22 to a take-up station 24. During the travel of the fabric from supply station 18 to the take-up station 24, it passes beneath spray stations 26 which spray metal, such as copper, on the side edges of the fabric in the region thereof containing the grouped conductive fibers 16. Metal spray guns of the nature disclosed are well known, and no detailed description thereof is given in this application.

Figure 5:
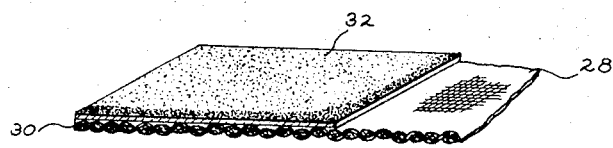
FIGURE 5 is a somewhat enlarged perspective view showing the appearance of one edge of the fabric after it has been metallized.

Each side edge of the fabric, after it passes the respective spray station 26, appears somewhat as illustrated in FIGURE 5 wherein the fabric, indicated at 28, has along each selvage region 30 thereof a sprayed-on metal coating 32, copper or silver or the like, for example. This sprayed-on material is in the form of very small particles and fibers of the metal and it penetrates the interstices of the fabric and of the individual fibers making up the fabric so that an extremely good bond, both mechanical and electrical, is formed between the sprayed-on material and the fabric, including the electrically conductive fibers of the fabric. The sprayed-on coating nevertheless is sufficiently thin as to be flexible and does not materially interfere with bending of the fabric. Even if the fabric is bent to the point that the sprayed-on material cracks, this is of little consequence because the terminal strips subsequently soldered to the sprayed-on material will still have good electrical connection with the electrically conductive fibers of the fabric.

Figure 6:
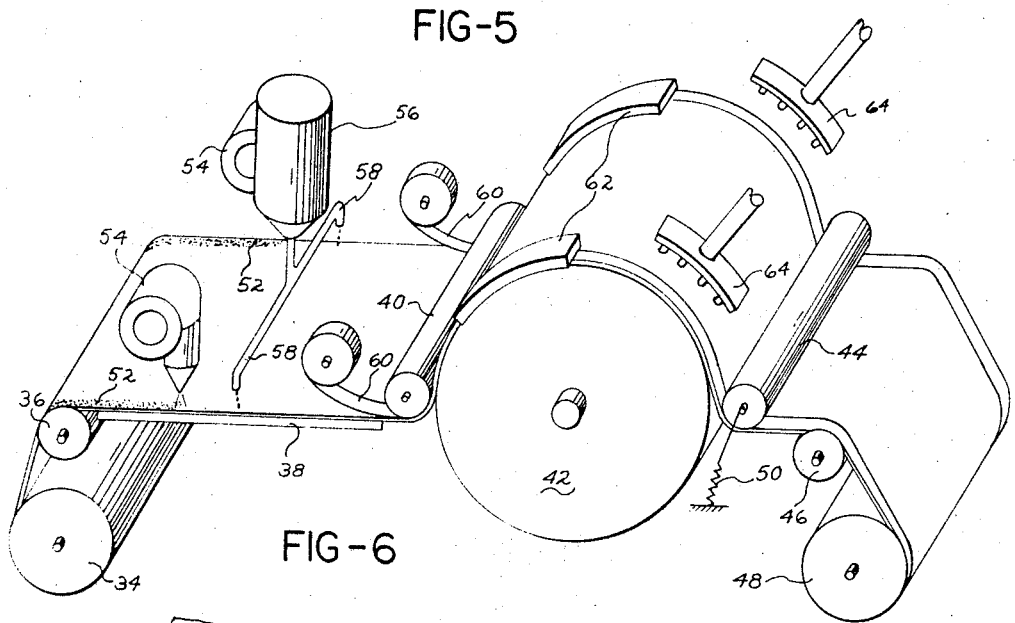
FIGURE 6 is a somewhat schematic perspective view showing the application to the edges of the fabric of the solder material, soldering flux and the electrically conductive terminal strips.

Turning now to FIGURE 6, the supply station 34 thereof consists of fabric taken from take-up station 24 of the FIGURE 4 apparatus. This fabric is sent over a first roll 36 and a supporting table 38 to a second roll 40 beneath which the fabric passes and which roll 40 is positioned adjacent a drum 42 of substantial size. The fabric passes over substantially the upper half of drum 42 and then under another roll 44 and then over another guide roll 46 to a take-up station 48. Roll 44 may, if desired, be provided with biasing springs 50 so that the fabric is held firmly against drum 42.

After the fabric passes over the first roll 36, the metallized edge portions 52 thereof pass beneath respective spray stations 54 from which is sprayed solder material so as to apply a solder coating over the metallized coating. Further along soldering flux is applied to the solder, as from a flux reservoir 56, and supply conduit means 58. Following the application of the flux material, a ribbon or strip 60 of electrically conductive material is supplied to each side edge of the fabric. This material may be any good electrically conductive material, such as copper, and may be relatively thin, say 0.001 to 0.003 inch thick. A strip of this nature is flexible and will ordinarily conduct ample electric current to supply the heating element. The larger the heating element, of course, the thicker and wider the conductive strip must be in order to avoid objectionable electrical loss in the non-conductive strips and the loss of efficiency of the heating element.

As the fabric starts around drum 42 carrying with it strips 60, it comes under the influence of the arcuate heating strip means 62 adjacent the side edges of the fabric.

The heating strip means applies sufficient heat to the conductive strips 60 to melt the solder therebeneath, thus forming a good electrical and mechanical connection of the conductive strips to the metallized side edges of the fabric. Further around the drum from heating strips 62 are cooling stations 64 consisting of, for example, a plurality of air nozzles, or any other suitable means for cooling the conductive strips and the edges of the fabric therebeneath so as to cause the solder to set up and solidify, whereby the connection of the conductive strips to the side edges of the fabric will be made permanent.

Figure 7:
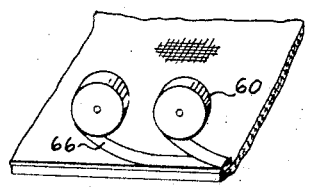
FIGURE 7 is a fragmentary view showing the application of solder to the edges of the fabric in the form of strips.

As will be seen in FIGURE 7, the solder could be employed in the form of a strip 66, if so desired, and this strip might, for example, represent solder carrying its own fluxing material, thus serving the function of both of the stations 54 and 56 of FIGURE 6.

Figure 8:
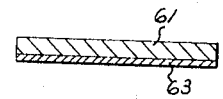
FIGURE 8 is a sectional view through a terminal strip showing how it could be provided with a solder coating applied thereto prior to joining the terminal strip with the fabric.
Figure 9:
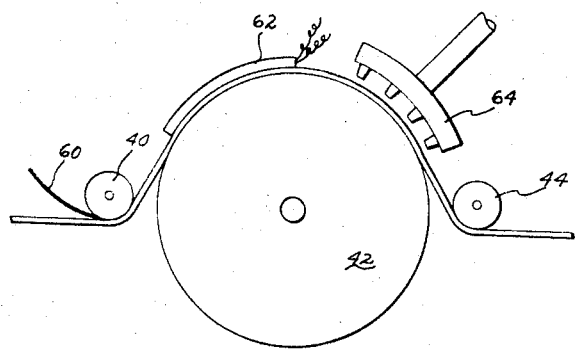
FIGURE 9 is a side view of a drum forming a part of the apparatus of FIGURE 6, showing more in detail the manner in which the conductive strip is heated to cause melting of the solder and joining of the conductive strip to the fabric, and how the conductive strip is cooled to set up the solder.

Still further, as will be seen in FIGURE 8, the conductive strips, identified at 61 in FIGURE 8, could be pretinned on at least one side, as at 63, thus carrying the solder to the fabric, together with the conductive strip.

FIGURE 12 shows how a screen-like strip 100 could provide the terminal strip. Further, the coating or layer 102 under the strip 100 could be solder or plastic, or rubber-like material into which the strip could be pressed. The plastic or rubber-like material is made conductive by loading it with conductive particles, graphite for example, during the compounding thereof.

Following the application of the conductive strips to the side edges of the fabric, the fabric is cut to a desired length to form a heating element of the required size. This can be done in an apparatus of the nature disclosed in FIGURE 10. In FIGURE 10 there is a roll at 68 of fabric as it comes from the apparatus of FIGURE 6, namely, a fabric having electrically conductive strips fixed to the side edges thereof.

This fabric is fed over a roll 70 and support table means 72 to a cut-off station 74 where the fabric is cut into individual lengths to form individual heating elements generally indicated at 76, each having a conductive strip at each of its side edges.

Since the selvage of the fabric extends in the direction of its length, the fabric will fray where it is cut. This is prevented by the use of the apparatus of FIGURE 10 by spraying laterally extending regions 78 of the fabric with, for example, a melted plastic which will solidify substantially upon contact, such as a high melting point plastic and which extends on both sides of the line along where the fabric is to be cut off. This has proved highly efficient for preventing fraying of the cut edges of the fabric without further treatment thereof.

The plastic material is applied from a pressurized spray gun 80, preferably heated, with the spray gun being mounted for lateral movement on tracks 82. The fabric may be halted during the application of plastic thereto, or tracks 82 may be caused to move with the fabric and the plastic applied thereto on the fly.

In the cutting station 74 there is a stationary knife 84 and a movable knife member 86, reciprocating, for example, which cuts off the fabric in about the center of each of the regions 78. The fabric can be halted during the cutting operation, or the knife can move with the fabric and effect the cutting off on the fly according to known cut-off practices.

Heating elements manufactured according to the present invention can be adapted to substantially any voltage and current supplies, and can be employed in the form of small heating elements or can be as large as a wall of a large room, for example. The heating elements need not necessarily be square, but can be rectangular in shape as well without effecting the properties thereof.

While it is preferable to weave the fabric to the same width the heating element is to be made, it will be understood that the present invention could be practiced by weaving fabric one width and forming heating elements somewhat narrower in width. For example, the fabric could be cut lengthwise and conductive strips applied to the edges thereof, or conductive strips could be applied to the fabric at spaced points thereof and the fabric cut along the middle of the conductive strips located inwardly of the wide edges of the fabric. This is illustrated in FIGURE 11, wherein fabric 90 has conductive strips 92 at the side edges and conductive strips 94 which are wider located between the edges. The fabric, after having the strips applied thereto, is cut along the lines 96 to form narrow lengths of the fabric which can thereafter be cut off in shorter lengths. Preferably, the region under each conductive strip has a concentration of conductive warp fibers therein to improve the electrical connection of the conductive strips to the fabric.

Among particular uses for a woven heating element constructed according to the present invention is that of using it to warm automobile seat cushions and the like. It can also be placed under rugs or carpets to provide for room heating or mounted on walls or ceilings or the like to heat enclosures. The fabric is sufficiently rugged to withstand the abuse it would receive when used in an automobile seat, and is inexpensive enough to make its use practical, and can be adjusted electrically to adapt it to voltages available under these or substantially any other circumstances.

In the specification and claims in this application, it will be understood that the term "graphite" is employed according to its scientific sense, namely, as including all forms of carbon except diamond. It is thus understood that such forms of carbon or graphite as lamp black and carbon granules and flakes and the like, and including the form which the carbon takes when a filament is heat-treated, are included within the purview of the term "graphite."

While the method of the present invention is shown as being carried out in several separate devices, it will be understood that the devices could be combined in a single apparatus for carrying out the several steps of the method continuously.

It will be understood that this invention is susceptible to modification in order to adapt it to different usages and conditions; and accordingly, it is desired to comprehend such modifications within this invention as may fall within the scope of the appended claims.

I claim:

1. An apparatus for making fabric heating elements, said heating elements comprising fabric having conductive fibers extending transversely thereof in longitudinally distributed relation, and also comprising conductive fibers extending longitudinally of the fabric in predetermined lateral regions thereof, said apparatus comprising; first means for applying a substantially continuous layer of conductive material to each said predetermined region of the fabric, an electrically conductive terminal strip for each said region, and second means for applying a said electrically conductive terminal strip to each said layer to connect the conductive strips to the fabric.

2. An apparatus for making fabric heating elements according to claim 1, in which said apparatus also includes third means for severing said fabric along lines extending transversely thereof to cut the fabric into predetermined lengths.

3. An apparatus for making fabric heating elements according to claim 2, in which said apparatus includes means for applying a binder material to said fabric in the regions adjacent to and extending on opposite sides of said lines to prevent fraying of said fabric.

4. An apparatus for making fabric heating elements according to claim 1, in which said first means comprises means for metallizzing the said predetermined lateral regions of the fabric, and said terminal strips being thin and flexible and being soldered to said layers.

5. An apparatus for making fabric heating elements according to claim 1, in which said first means comprises means for applying an electrically conductive rubber-like plastic material to said region.

6. An apparatus for making fabric heating elements according to claim 5, in which each said strip is a perforated strip of metal.

7. An apparatus for making fabric heating elements according to claim 6, in which said strip of metal is screen.

8. An apparatus for making fabric heating elements according to claim 3, in which said fourth means is arranged to spray said binder material on said fabric prior to operation of said third means.

9. An apparatus for making fabric heating elements according to claim 1, in which said fibers are textile fibers.

10. An apparatus for making fabric heating elements according to claim 1, in which said fibers are carburized textile fibers.

References Cited

UNITED STATES PATENTS 3,283,987   11/1966   Kauffman _____ 228—5

RICHARD H. EANES, *Primary Examiner.*